S. BERLOTTI.
METALLIC CONTAINER.
APPLICATION FILED NOV. 8, 1920.
1,426,345.                                    Patented Aug. 22, 1922.
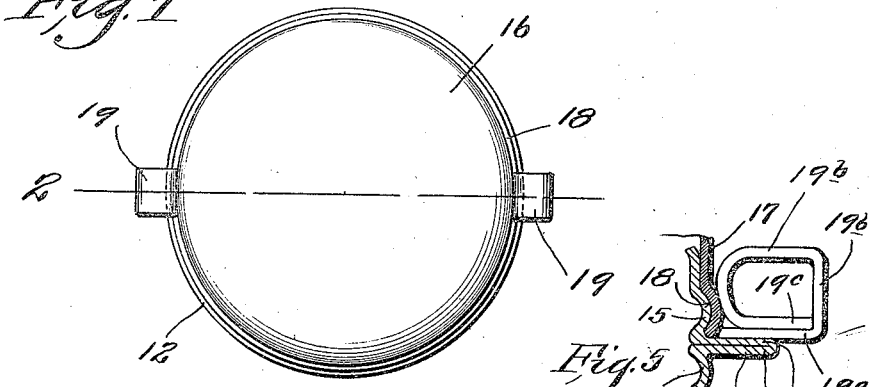
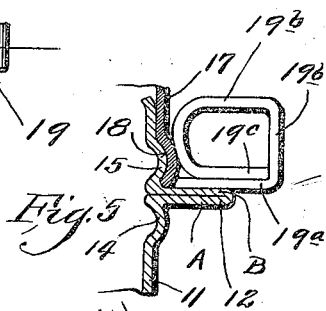
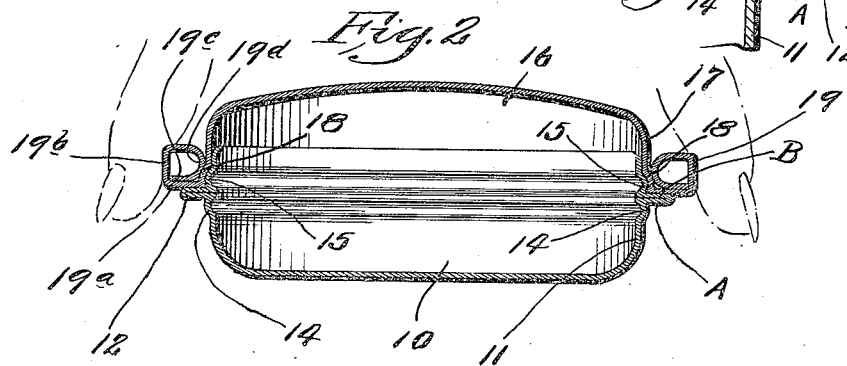
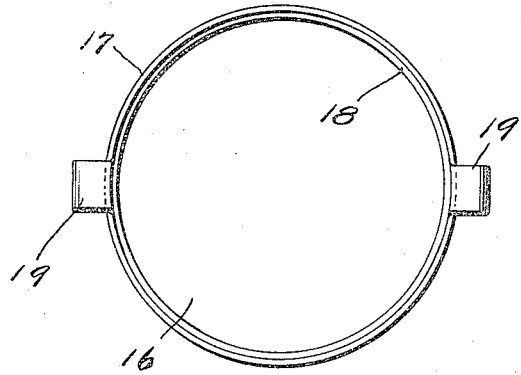
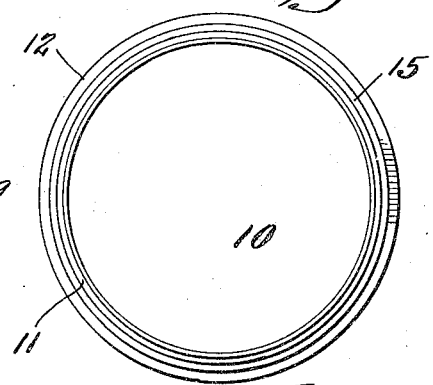
Inventor
Samuel Berlotti
By F. R. Cornwall, Atty.

UNITED STATES PATENT OFFICE.

SAMUEL BERLOTTI, OF ST. LOUIS, MISSOURI.

METALLIC CONTAINER.

1,426,345.     Specification of Letters Patent.     Patented Aug. 22, 1922.

Application filed November 8, 1920. Serial No. 422,487.

*To all whom it may concern:*

Be it known that I, SAMUEL BERLOTTI, a citizen of the United States, residing at St. Louis, Missouri, have invented a certain new and useful Improvement in Metallic Containers. of which the following is a full, clear, and exact description, such as will enable others skilled in the art to which it appertains to make and use the same, reference being had to the accompanying drawings, forming part of this specification.

This invention relates to improvements in metallic containers, and has for its principal object an improved container which is of simple but durable construction, and is provided with an air tight cover which can be easily and quickly removed without sticking or binding. Heretofore, containers of this type were provided with removable tops or covers having straight annular flanges adapted to be fitted over the annular flange on the container. It is obvious that in order to retain the cover in position, it has to form a tightly fitting joint with the wall of the container. When it is desired to open the container of this type, the cover has to be removed forcibly, usually by prying it open with some instrument applied to the edge of the cover. In some instances a member pivoted to the container is used to bear against the edge of the cover and pry it open. This practice distorts the shape of the cover so that it no longer forms an air tight joint with the wall of the container, thus permitting the air to enter said container, drying out the contents and thereby causing deterioration and destroying the usefulness of the container.

Further objects of this invention are to provide a metallic container which is simple but strong and inexpensive to manufacture; to provide a container and a cover therefor which can be easily and quickly removed without the use of force or any kind of tools and without distortion of the container or its cover; and to provide a container having an external annular rib and a cover for said container having an annular groove adapted to engage the rib of the container to form an air tight joint.

With the foregoing and other objects in view, my invention consists in certain novel features of construction and arrangements of parts hereinafter more fully described and claimed, and illustrated in the accompanying drawings, in which—

Figure 1 is a top plan view of the container with the cover thereon.

Figure 2 is a vertical cross-section taken on the line 2—2 of Figure 1.

Figure 3 is a bottom view of the cover.

Figure 4 is a plan view of the container with the cover removed.

Figure 5 is an enlarged detail view on line 5—5 of Figure 1.

Referring by numerals to the accompanying drawings, 10 is the container of circular shape and having an upwardly extending annular wall 11. This wall is provided with a horizontal annular flange 12, which is formed by pressing a portion of wall 11 outwardly and then pressing the upper and lower walls A and B of said portion towards each other so that that portion of wall 11 is refolded and pressed together to form an annular flange which reinforces the wall of said container and provide suitable means to be gripped by the fingers of one hand while the cover is being removed by the other hand.

In order to stiffen and strengthen horizontal flange 12 an annular shoulder or rib 14, which is curved in cross-section, is pressed outwardly from wall 11 immediately below said flange 12. A similar annular shoulder or rib 15 is pressed outwardly from wall 11 immediately above said flange. Annular ribs 14 and 15 reinforce wall 11 and horizontal flange 12 by forming a rigid connection between said wall and flange.

The outwardly projecting annular rib 15 also serves the purpose of maintaining an air tight joint between said container and cover 16. Cover 16 has an annular flange 17 adapted to engage the wall 11 of container 10 and terminating in an annular groove 18 which is adapted to receive the rib 15. Cover 16 is provided with diametrically disposed grips or lugs 19. These grips 19 are integral with said covering and are formed by making the blank of the cover with outwardly projecting comparatively narrow strips which, when the cover is shaped, are bent outwardly at right angles to flange 17 so as to provide horizontal bottom portions 19$^a$ and then outwardly to form vertical outer walls 19$^b$ and are then bent downwardly and inwardly so that the ends 19$^c$ bear against the vertical walls 19$^b$ while the curved portion 19$^d$ bears against the flange 17 of said cover 16. This particular construction provides grips or lugs which can be conveniently gripped by the fingers of one hand in order to remove the cover, and which are of strong and durable construction and are not distorted or bent by strains or pressures applied to them when removing the cover. The co-operation of curved annular groove 18 on cover 16 provides efficient connection between said container and cover, which connection is air tight, thereby preserving and protecting the contents of the container and preventing the sticking or binding of the cover.

In order to remove the cover, the container is held between the fingers of one hand and preferably at points at right angles to lugs or grips 19, while said lugs are grasped between the fingers of the other hand. In this manner, the container can be conveniently grasped while the cover is being removed.

Obviously my invention permits of various modifications without departing from the spirit thereof, and I do not wish to be limited to the specific construction described.

What I claim is:

1. A metallic container having an outwardly projecting annular flange and annular reinforcing beads pressed outwardly above and below said flange at the points of junction of said flange with the wall of the container, and a cover therefor provided with an annular groove adapted to engage the upper one of said beads and having oppositely disposed lugs formed integral with said cover and adapted to overhang the flange of said container.

2. In combination with a metallic container having a wall provided with an outwardly projecting peripheral flange and an annular rib formed above said flange, of a cover for said container having a depending flange terminating in an inwardly disposed groove which is adapted to engage the rib on said container and projections on said cover formed by bending and rebending extensions on said cover whereby said projections overhang the flange of the container and the inner faces of said projections bear against said cover and their outer faces are parallel with the wall of the cover to form suitable grips.

3. A metallic container having an annular wall provided with an outwardly projecting horizontal flange, annular ribs disposed above and below said flange and joining it with said wall, a cover having an annular flange terminating in an inwardly disposed groove adapted to engage the upper one of said ribs when the cover is in position and diametrically disposed lugs formed by folding and refolding upon themselves portions projecting from the flange of said cover whereby said lugs project outwardly past the flange on the container, said lugs having outer walls adapted to be gripped between the fingers and inner walls bearing against the flange of said cover, the ends of said portions being bent inwardly and outwardly to rest against the outer walls of said lugs.

4. In combination with a metallic container having an outwardly projecting rib circumferentially disposed on the wall thereof, of a cover having a depending flange terminating in a circumferential groove arranged to co-operate with the rib on said container to form an air tight joint, and oppositely disposed projections on said cover adapted, when said cover is in position, to overhang the flange of the container, said projections being formed by rebending strips projecting from and formed integral with the flange of said cover, whereby the ends of said strips bear against the outer portions of said projections and the inner portions bear against the flange on the cover.

In testimony whereof I hereunto affix my signature this 3rd day of November, 1920.

SAMUEL BERLOTTI.